United States Patent
Sumpter, Sr.

(10) Patent No.: US 6,945,362 B1
(45) Date of Patent: Sep. 20, 2005

(54) OIL DRIP COLLECTOR

(76) Inventor: Alray Sumpter, Sr., 10681 Catawba Ave., Fontana, CA (US) 92337

(*) Notice: Subject to any disclaimer, the term of this patent is extended or adjusted under 35 U.S.C. 154(b) by 37 days.

(21) Appl. No.: 10/234,046

(22) Filed: Aug. 29, 2002

Related U.S. Application Data

(60) Provisional application No. 60/316,657, filed on Aug. 30, 2001.

(51) Int. Cl.[7] ............................................. F16N 31/02
(52) U.S. Cl. .................................................... 184/106
(58) Field of Search ................ 184/1.5, 106; 180/69.1; 123/198 E; 141/98, 86–88; 296/38

(56) References Cited

U.S. PATENT DOCUMENTS

| | | | | |
|---|---|---|---|---|
| 1,094,210 A | * | 4/1914 | Hughes | 184/106 |
| 2,783,848 A | | 3/1957 | Beskid | 184/106 |
| 3,282,381 A | * | 11/1966 | Fitzpatrick | 184/106 |
| 3,329,231 A | | 7/1967 | Takenouchi | 184/106 |
| 3,669,204 A | * | 6/1972 | Andrews | 180/69.1 |
| 4,114,717 A | * | 9/1978 | Andrews | 180/69.1 |
| 4,875,537 A | * | 10/1989 | Garnatz et al. | 180/69.1 |
| 4,909,355 A | * | 3/1990 | Ramos | 184/106 |
| 4,936,418 A | | 6/1990 | Clausen | 184/106 |
| 5,404,848 A | | 4/1995 | Nelson | 123/198 E |
| 5,417,310 A | * | 5/1995 | Halseth | 184/106 |
| 5,526,900 A | * | 6/1996 | Mason | 184/106 |
| 5,711,402 A | | 1/1998 | Sumpter | 184/106 |
| 5,928,751 A | * | 7/1999 | Van Romer et al. | 428/68 |
| 5,957,241 A | * | 9/1999 | Anderson | 184/106 |
| 6,475,594 B2 | * | 11/2002 | Johnston et al. | 428/100 |

* cited by examiner

*Primary Examiner*—Chong H. Kim
(74) *Attorney, Agent, or Firm*—Knobbe, Martens, Olson & Bear, LLP

(57) ABSTRACT

An apparatus for capturing oil dripping from the bottom of a vehicle. The apparatus includes a pan that is preferably made of a rigid material such as aluminum or hard plastic. Positioned within the pan is a pad that includes an absorbent layer, which readily absorbs oil, and a barrier layer, through which oil is unlikely to pass. The absorbent layer of the pad faces engine components that could potentially leak oil. The barrier layer faces the pan. The pad is also configured to be positioned within the pan so as to be easily replaceable once the pad becomes saturated with oil.

6 Claims, 3 Drawing Sheets

OIL DRIP COLLECTOR

RELATED APPLICATIONS

This application claims the benefit of U.S. Provisional Application No. 60/316,657, filed on Aug. 30, 2001 entitled "Oil Drip Collector".

BACKGROUND OF THE INVENTION

1. Field of the Invention

The present invention relates to accessories for automobiles and, in particular, concerns an accessory that is attached to the underside of an automobile to capture oil and other drippings from the engine, the transmission or other ancillary parts of the automobile power train.

2. Description of the Related Art

One difficulty with automobiles is that the engines have a tendency, after long usage, to leak oil. The leaked oil can result in driveways and garages being stained. Further, the leakage of oil from the underside of cars results in a significant amount of oil accumulating on the roadways. During rains, this can present a driving hazard to motorists as the oil makes the roadway slick. Additionally, during rains the oil on the roadways eventually ends up in streams and other waterways thereby creating a significant environmental problem.

To address this particular problem, several oil drip collection devices have been developed. For example, U.S. Pat. No. 4,936,418 discloses an oil drip collector that is essentially comprised of an oval-figured flexible sheet-like member that has springs to attach it to the underside of a vehicle. This pad is positioned underneath the vehicle and preferably has an absorbent sponge that is adhered to the flexible piece of material. The absorbent sponge collects the oil dripping from the engine and thereby prevents it from falling to the roadway.

One problem with the device disclosed in U.S. Pat. No. 4,936,418 is that the absorbent sponge is small in cross-section and is not easily replaced. Specifically, as the sponge is saturated with oil, the entire device must be replaced. Further, this device is designed to be positioned underneath the automobile in the proximity of fast moving flying debris. Consequently, over long term usage, the flexible sheet can become torn or ripped which reduces the effectiveness of the device in preventing oil from dripping to the roadway during operation of the vehicle.

Several other oil catching devices have also been developed, however, they generally suffer from problems similar to the problems suffered by the device disclosed in U.S. Pat. No. 4,936,418. Specifically, many of the oil drip collection devices previously developed consist of a single piece of absorbent material that is configured to be positioned underneath the engine of an automobile. Once this absorbent material is saturated with oil, the entire device has to be replaced. With some prior devices, the absorbent material is exposed to the roadway such that when the absorbent material becomes saturated, oil will drip from the absorbent material onto the roadway. Further, these types of oil collection devices use sponges and fibrous materials to absorb oil which often are very expensive and not specifically adapted to collecting and retaining oil.

Even further, many of these devices disclosed in the prior art are comprised of a single piece of fabric material. It will be appreciated that the device is to be located underneath the car, adjacent the roadway, in a position where the fabric is likely to be struck by rocks and debris. These rocks and debris can tear or otherwise damage the device thereby reducing its effectiveness in collecting dripped oil.

Although there are some prior art devices that position a plate underneath an absorbent material (See, e.g., U.S. Pat. No. 5,404,848 and U.S. Pat. No. 3,329,231) these prior art devices are difficult to use, manufacture, and they utilize expensive absorbent materials. In particular, U.S. Pat. No. 2,783,848 discloses a device that uses a single sheet of absorbent material, such as porous paperboard, which is not very effective in absorbing large quantities of dripping oil. Further, while U.S. Pat. No. 3,329,231 discloses using a package of material such as sand and the like, the package that appears to have been contemplated in this patent is a single package of material. The absorbent material contained within the package can therefore be non-uniformly dispersed within the package as the vehicle moves to the point where oil is not absorbed by the absorbent materials in particular location.

Hence, from the foregoing, it can be appreciated that there is a need for an oil drip collection device that has absorbent material spread out over a large area and is easily replaceable. Further, the needed device should also be configured so that the absorbent component is adequately protected from damage by rocks and other roadway debris and the absorbent material remains uniformly dispersed under the engine so that oil dripping from different locations can be absorbed.

SUMMARY OF THE INVENTION

To address these needs, the oil drip collector is comprised of a pan configured to be attached to the vehicle in a location wherein oil dripping from the vehicle will fall within a space defined by the pan. The oil drip collector also comprises a pad, wherein the pad comprises an absorbent layer and a barrier layer. The pad is positioned within the space defined by the pan so that the oil dripping from the vehicle lands on and is substantially retained by the absorbent layer of the pad. Also, the barrier layer substantially prevents any oil not immediately absorbed by the absorbent layer from contacting the pan.

The pan includes a plurality of inwardly extending protrusions and the pad includes a plurality of openings formed in an outer surface of the pad. The protrusions can be inserted into the plurality of the openings in the pad so as to retain the pad in a position whereby the pad covers substantially the entire area of the space defined by the pad.

The pan is preferably made of a metal material, such as aluminum, or a plastic material, and is configured so that when the pad is positioned within the pan, the pan provides protection to the pad from flying roadway debris. Further, the pan has springs, which extend outward from the outer perimeter of the pan and attach to locations underneath the car to thereby position the pan under the area where the dripping oil is likely to originate. It will be appreciated that, once the pan is appropriately positioned, the pan will not have to be completely removed even when the pad becomes saturated; the pan substantially remains in place and the pad can simply be replaced in the pan. This saves time for a person replacing a saturated pad as the person does not have to reposition all of the springs and hooks necessary to retain the pan in the desired position. These and other objects and advantages of the present invention will become more fully apparent from the following description taken in conjunction with the accompanying drawings.

DETAILED DESCRIPTION OF THE PREFERRED EMBODIMENT

Figure 1:
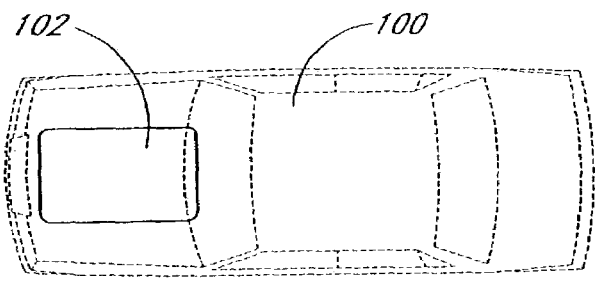
FIG. 1 is a top view of an automobile illustrating where the oil drip collection apparatus of the preferred embodiment is to be installed.
Figure 2:
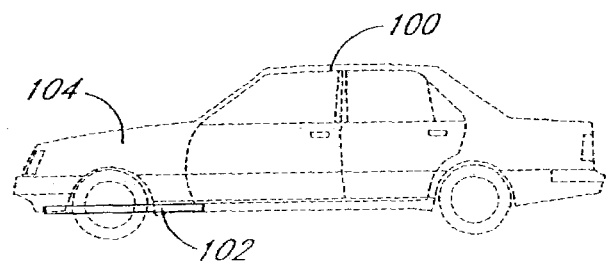
FIG. 2 is a side view of the automobile shown in FIG. 1 further illustrating the positioning of the oil drip collection apparatus on the automobile.

Reference will now be made to the drawings wherein like numerals refer to like parts throughout. FIG. 1 is a top view of an automobile 100 with a preferred embodiment of the oil drip collection apparatus 102 shown schematically as being installed underneath the engine compartment of the automobile 100. FIG. 2 is a side view of the automobile 100 further illustrating that the oil drip collection apparatus 102 is to be installed under the engine compartment 104 of the automobile 100. It will be appreciated that the exact dimensions of the oil drip collection apparatus 102 of the preferred embodiment will vary depending upon the configuration of the automobile 100. However, it is preferred that the oil drip collection apparatus 102 be dimensioned so as to be positioned substantially underneath the engine of the automobile 100.

As will be understood, the oil collection apparatus 102 should be positioned in the optimum position so that oil dripping from the engine or related parts of the automobile 100 should drip onto an upper surface of the oil collection apparatus 102. It will also be appreciated that the oil collection apparatus 102 should be positioned substantially adjacent the surfaces that the oil drips from as the dripping oil may otherwise be blown horizontally away from the oil collection apparatus 102 when the automobile 100 is moving.

Figure 3:
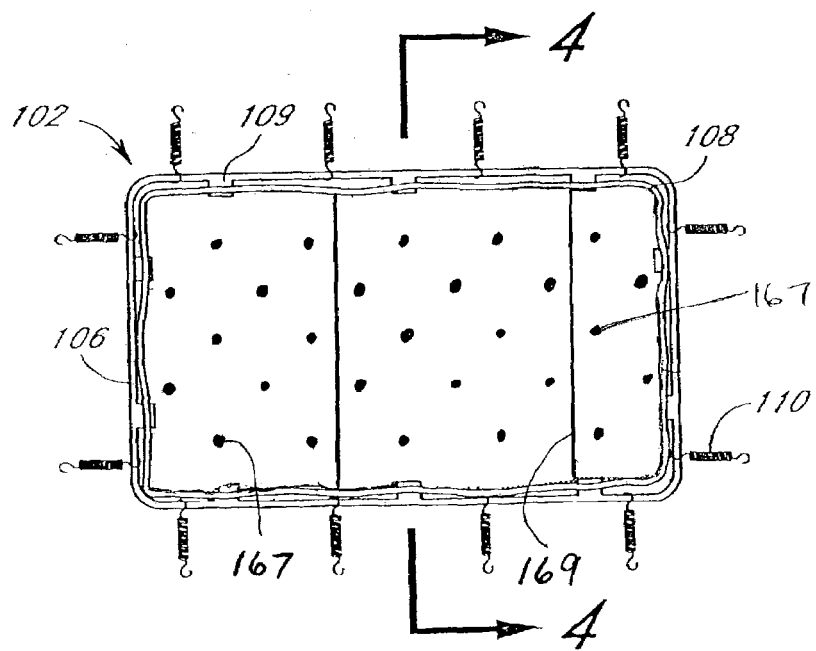
FIG. 3 is a top view of the oil collection apparatus of the preferred embodiment.
Figure 5:
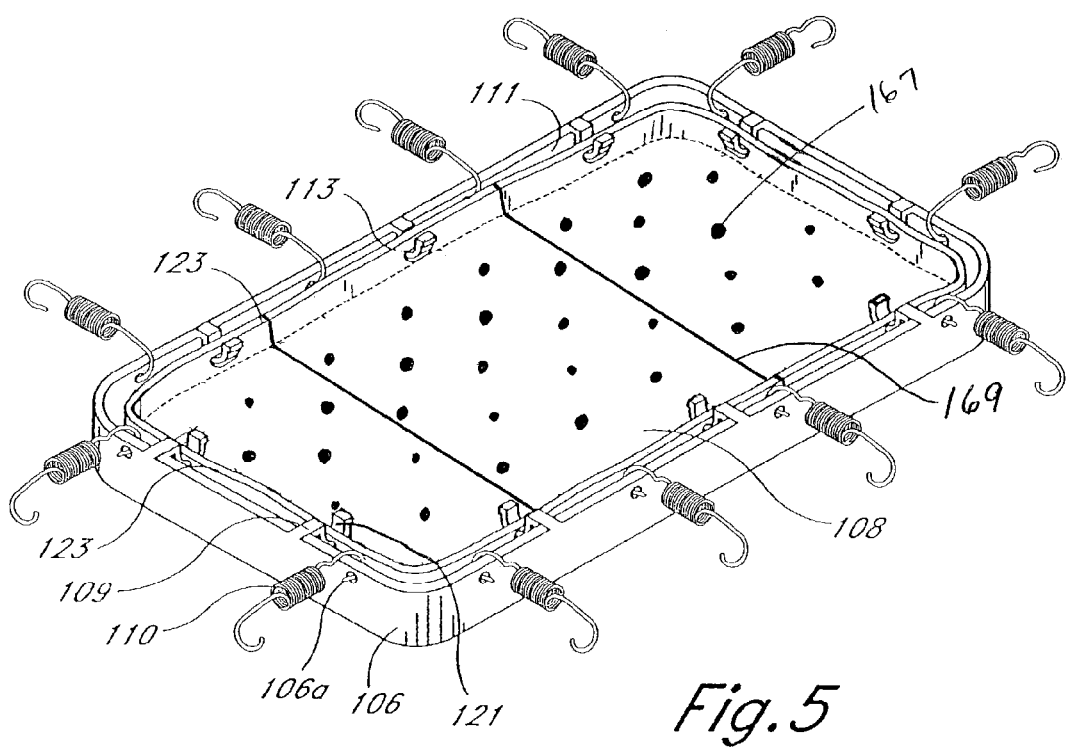
FIG. 5 is a perspective view of the apparatus shown in FIG. 3.

Further, it may be desirable to extend the oil collection apparatus 102 so that it is also positioned underneath the transmission of the automobile as the transmissions in automobiles also have a tendency to leak transmission fluid or oil after long usage. As shown in FIGS. 3 and 5, the oil collection apparatus is comprised of a pan 106 and a pad 108 positioned within the pan 106. The pan 106 has holes 106a along the outer perimeter that are configured to receive a plurality of springs 110. The springs 110 can then be hooked to components on the underside of the engine of the automobile 100 to securely retain the pan 106 in the position shown in FIGS. 1 and 2. Preferably, the springs 110 are hooked to components on the underside of the engine so that the pan 106 is substantially horizontally oriented underneath the engine compartment 104 of the automobile 100. In the embodiment shown in FIG. 3, a total of ten springs 110 are provided, however, it will be appreciated that more or less springs 110 may actually be used to securely position the device 102 underneath the automobile in the desired orientation. Once the springs 110 are hooked to the various components in the engine compartment 104, the pan 106 should be securely positioned underneath the engine compartment 104 substantially adjacent the under surface of the engine. It can be appreciated that the springs 110 could be substituted for latches or other attachment hardware without taking away from the spirit of the present invention.

As is also shown in FIG. 3, the pan 106 has a plurality of inwardly extending protrusions 109 that extend inward into an inner space 111 defined by the pan 106. These protrusions 109 are configured to mate with a plurality of openings 113 (See FIGS. 4 and 5) on the pad 108 to securely retain the pad 108 within the pan 106 so that the pad 108 is equally distributed within the pan 106 in the manner shown in FIG. 3. The protrusions 109 preferably have a recess 121 that is configured to receive a seamed surface 123 of the pad 108 to securely retain the pad 108 in the pan 106.

The protrusions 109 and the openings 113 are preferably configured so that the pad 108 can be removed and replaced from the pan 106. In the embodiment shown in FIG. 3, the protrusion 109 extends through an opening, however, it will be appreciated that a separate mating protrusion may be attached to the pad 108 to achieve the same interconnection between the pad 108 and the pan 106.

In other embodiments not shown, attaching the pad 108 to the pan 106 is achieved by other means. For example, clamps (not shown) are attached to the pan 106 and the clamps can be pivoted downward in a closed position to substantially retain the pad 108. It can be appreciated that using alternative means for attaching the pad 108 to the pan 106 does not take away from the spirit of the invention.

Figure 4:
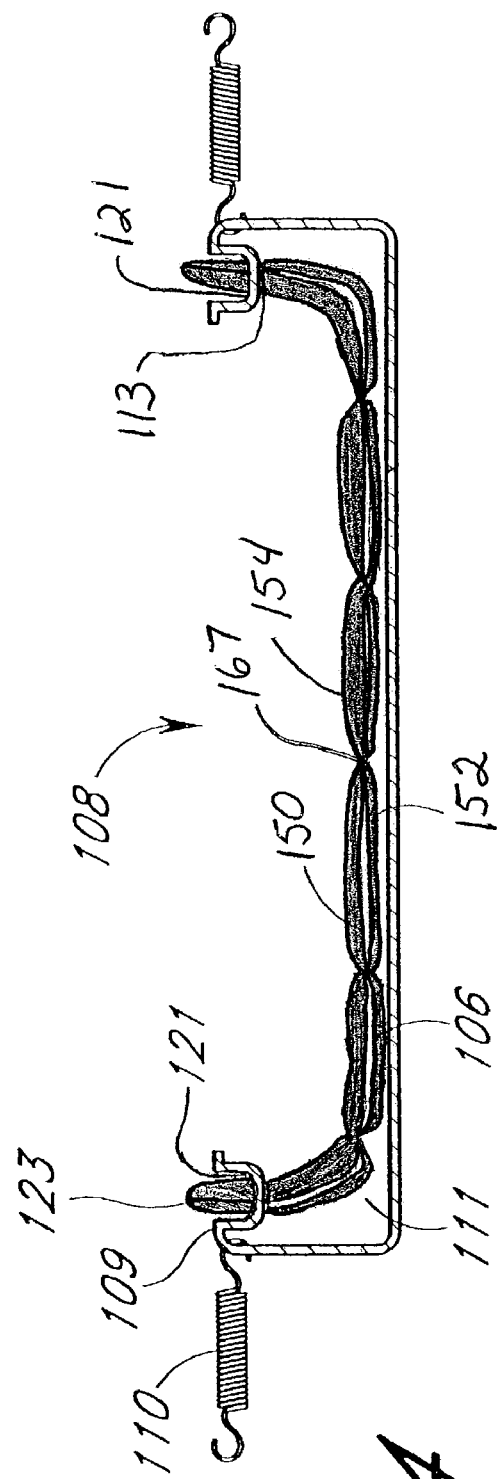
FIG. 4 is a cross-sectional view of the oil drip collection apparatus of FIG. 3.

As illustrated in FIG. 4, the pad 108 is divided into an absorbent layer 150 and a barrier layer 152. In one embodiment, the absorbent layer 150 comprises multiple layers of flame retardant, absorbent cloth. The absorbent layer 150 lies adjacent a top surface 154 of the pad 108, and positioned as such, the absorbent layer 150 is able to catch and absorb oil dripping down from the engine compartment 104. Advantageously, the dripping oil is more likely to be retained by the oil drip collector 102.

In one embodiment, the absorbent layer 150 comprises twelve layers of flame retardant, absorbent cloth. In a variation of this embodiment, the first four layers of cloth lying closest to the barrier layer 152 are cut in lengths and widths that are substantially equal to the final length of the pad 108. However, the remaining eight layers of cloth are cut to thinner widths, then laid out in strips to cover the first four layers. Forming the absorbent layer 150 in this manner creates visible seams 169. This type of fabrication advantageously allows for better absorption of oil because more surface area of the material making up the absorbent layer is exposed. All layers are joined together in a manner to be described below.

As stated, the pad 108 also comprises a barrier layer 152. In one embodiment, the barrier layer 152 comprises a flame retardant, non-porous, synthetic material, and due to the nature of the material, oil is not likely to pass through the barrier layer 152. As shown, the barrier layer 152 lies adjacent to the pan 106, and the barrier layer 152 retains any oil that is not immediately absorbed by the absorbent layer 150. Advantageously, dripping oil is more likely to be retained inside the pad 108 instead of dripping down into the pan 106 where it might escape the oil drip collector 102 entirely.

In the preferred embodiment, the absorbent layer 150 and the barrier layer 152 are joined together. In the embodiment shown in FIGS. 3, 4, and 5, the absorbent layer 150 and the barrier layer 152 are joined at a plurality of melt spots 167. To join the layers at a typical melt spot 167, a specific area (the area of the melt spot 167) is heated until the absorbent layer 150 and the barrier layer 152 melt together. This process is repeated at all other melt spot 167 locations.

At areas on the pad 108 other than the melt spots 167, the absorbent layer 150 preferably has adequate room to expand as it absorbs fluids. However, by joining the absorbent layer 150 and the barrier layer 152, loads induced into the pad 108 can be distributed over the area of the pad 108. As such, the pad 108 is less likely to tear due to excess loading. Advantageously, the pad 108 is more likely to stay intact and act as a uniform absorbent surface evenly dispersed under the vehicle.

In another embodiment, the pad 108 is formed in rolls having a width that is smaller than the width of the pan 106. As such, several pieces of the pad 108 must be joined together stitched together in a cross-hatched fashion at intermediate intervals. This creates a plurality of scams. In other embodiments, the absorbent layer 150 and barrier layer 152 are bonded with adhesives at intermittent locations.

Also, since manufacturing of the pad 108 only involves joining the absorbent layer 150 to the barrier layer 152 and adding the plurality of openings 113, the pad 108 of the preferred embodiment is relatively inexpensive. Advantageously, this reduces the cost of the entire oil drip collector 102. (One example of a preferred embodiment of the pad 108 is manufactured by New Pig Corporation of Tipton, Pa.)

Hence, when the oil drips off of the engine and related parts it lands on the absorbent layer 150, and if not immediately absorbed by the absorbent layer 150, then the oil is substantially retained by the barrier layer 152. Advantageously, the oil is less likely to drip onto unwanted surfaces like driveways, roadways, and the like.

Once the absorbent layer 150 in the pad 108 becomes saturated, the pad 108 can then be replaced, preferably by simply removing the pad 108 from the pan 106. It will be appreciated that the pan 106 may not have to be completely dismounted to remove the pad 108.

It will also be appreciated that the pan 106 serves two additional purposes. First, the pan 106 protects the pad 108 from damage resulting from rocks and other projectiles hitting the pad and ripping holes in the mesh material. Further, the pan 106 will capture any oil that would escape the barrier layer 152. Hence, the pan 106 provides additional protection from oil dripping onto the roadways or any other unwanted surface. Further, it will be appreciated that drain holes can be added to the pan to facilitate the draining of accumulated water from the pan.

From the foregoing it can be appreciated that the oil drip collection apparatus 102 of the preferred embodiment provides an effective apparatus for collecting excess oil that is dripping off the engine. Further, since the pad 108 is replaceable within the pan 106, the apparatus 102 can be used repeatedly and the pad can be interchanged with new pads when needed in a time effective manner.

Although the foregoing description of the preferred embodiment of the preferred invention has shown, described, and pointed out the fundamental novel features of the invention, it will be understood that various omissions, substitutions, and changes in the form of the detail of the apparatus as illustrated, as well as the uses thereof, may be made by those skilled in the art without departing from the scope and spirit of the present invention. Hence, the scope of the present invention should not be defined by the preceding description, but should be defined by the following claims.

What is claimed is:

1. An apparatus for capturing oil dripping from a vehicle comprising:
    a pan configured to be attached to the vehicle in a location wherein oil dripping from the vehicle will fall within a space defined by the pan;
    a pad, wherein the pad comprises an absorbent layer and a barrier layer, each of which define an upper and lower surface wherein the absorbent layer is made of multiple layers of absorbent cloth wherein the multiple layers include a first plurality of layers that are sized so as to be substantially equal to the final length of the pad and a second plurality of layers that are thinner and laid out in strips to cover the first plurality of layers so as to create a visible seam and wherein the pad is positioned within the space defined by the pad so that the oil dripping from the vehicle lands on and is substantially retained by the absorbent layer of the pad, wherein the absorbent layer and the barrier layer are melted together at a plurality of discrete locations throughout the upper and lower surface such that the plurality of discrete locations are separated from each other by the absorbent cloth and wherein the barrier layer substantially prevents any oil not immediately absorbed by the absorbent layer from contacting the pan and wherein the pan includes a plurality of inwardly extending protrusions and the pad includes a plurality of openings formed in an outer surface of the pad so that the protrusions can be inserted into the plurality of openings in the pad so as to retain the pad in a position whereby the pad covers substantially the entire area of the space defined by the pad.

2. The apparatus of claim 1, wherein the barrier layer comprises a non-porous synthetic material.

3. The apparatus of claim 1, wherein the protrusions define an indentation that is configured to receive a lip of the openings in the pad.

4. The apparatus of claim 1, wherein the pan is made of a rigid material so that the pan protects the pad from flying debris occurring during operation of the vehicle.

5. The apparatus of claim 1, further comprising a plurality of springs that are attached to an outer perimeter of the pan and are configured so that the pan can be attached to the underside of the vehicle through the springs.

6. The apparatus of claim 5, wherein the pan and the pad are configured so that the pad can be removed and replaced in the pan while at least a portion of the plurality of springs remain attached to the underside of the vehicle.

* * * * *